United States Patent [19]

Ahonen et al.

[11] Patent Number: 4,865,436
[45] Date of Patent: Sep. 12, 1989

[54] LOW COST RING LASER ANGULAR RATE SENSOR

[75] Inventors: Robert G. Ahonen, Cedar; John Malenick, Minneapolis; Hans P. Meyerhoff, Fridley, all of Minn.

[73] Assignee: Honeywell Inc., Minneapolis, Minn.

[21] Appl. No.: 106,002

[22] Filed: Oct. 7, 1987

Related U.S. Application Data

[63] Continuation of Ser. No. 843,959, Mar. 25, 1986, abandoned.

[51] Int. Cl.[4] .............................................. G02B 26/00
[52] U.S. Cl. ..................................... 350/487; 350/6.6; 350/609
[58] Field of Search .......................... 350/487, 6.6, 609

[56] References Cited

U.S. PATENT DOCUMENTS

| | | | |
|---|---|---|---|
| 2,464,141 | 3/1949 | Maier | 350/609 |
| 2,866,011 | 12/1958 | Kornei . | |
| 3,024,318 | 3/1962 | Duinker et al. . | |
| 3,508,014 | 4/1970 | Mersing . | |
| 3,781,486 | 12/1973 | Maryatt et al. . | |
| 3,912,483 | 10/1975 | Sugaya et al. . | |
| 3,913,143 | 10/1975 | Schneider et al. . | |
| 3,930,731 | 1/1976 | Andringa . | |
| 3,945,038 | 3/1976 | Lazzari . | |
| 3,996,461 | 12/1976 | Sulzbach et al. . | |
| 4,052,749 | 10/1977 | Nomura et al. . | |
| 4,190,364 | 2/1980 | Ljung et al. . | |
| 4,203,080 | 5/1980 | Wright et al. . | |
| 4,271,397 | 6/1981 | Stiles et al. . | |
| 4,281,930 | 8/1981 | Hutchings . | |
| 4,288,307 | 9/1981 | Wasa et al. . | |
| 4,315,991 | 2/1982 | Hagy et al. . | |
| 4,388,344 | 6/1983 | Shuskus et al. . | |
| 4,444,467 | 4/1984 | Shuskus et al. . | |
| 4,451,119 | 5/1984 | Meyers et al. . | |
| 4,519,708 | 5/1985 | Perlmutter et al. . | |
| 4,525,028 | 6/1985 | Dorschner . | |
| 4,623,228 | 11/1986 | Galasso et al. . | |
| 4,655,555 | 4/1987 | Machler et al. . | |
| 4,676,643 | 6/1987 | Vescial . | |

FOREIGN PATENT DOCUMENTS

| | | | |
|---|---|---|---|
| 56-91487 | 7/1981 | Japan . | |
| 2059143 | 4/1981 | United Kingdom | 372/107 |

OTHER PUBLICATIONS

"Hybrid Metal Mesh-Dielectric Mirrors for Optically Pumped Far Infrared Lasers", E. J. Danielewicz and P. D. Coleman, Applied Optics, vol. 15, No. 3, pp. 761–767, Mar. 1976.

"SiC, A New Material for Mirrors", W. J. Chovke, R. F. Farich and R. A. Hoffman, Applied Optics, vol. 15, No. 9, pp. 2006–2007, Sep. 1976.

"Van Nostrands Scientific Encyclopedia", copyright 1976, Published Van Nostrand Reinhold Co., p. 1185.

*Primary Examiner*—Bruce Y. Arnold
*Assistant Examiner*—Rebecca D. Gass
*Attorney, Agent, or Firm*—Robert A. Pajak

[57] ABSTRACT

A ring laser angular rate sensor is constructed from a solid block with mirror assemblies joined to the block a by thermally formed and gas tight seal comprised of a thin film of glass.

7 Claims, 2 Drawing Sheets

LOW COST RING LASER ANGULAR RATE SENSOR

This application is a continuation of application Ser. No. 843,959, filed Mar. 25, 1986 abandoned.

BACKGROUND OF THE INVENTION

The present invention relates to a novel construction for a ring laser angular rate sensor and more particularly, to a construction which is less costly to manufacture than prior art constructions.

Ring laser angular rate sensors are well known and are particularly described in U.S. Pat. No. 3,373,650, issued to Killpatrick, and U.S. Pat. No. 3,390,606, issued to Podgorski, both of which are assigned to the assignee of the present invention. The above-referred to patents are incorporated herein by reference thereto. Ring laser angular rate sensors of the type referred to commonly utilize a block of material that is dimensionally stable, both thermally and mechanically. The block usually includes a plurality of interconnected gas containing tunnels or passages which form a closed-loop path in the shape of a triangle, a rectangle, or any polygonal path. At each intersection of a pair of interconnected tunnels is a mirror mounted on the block. This arrangement of mirrors and interconnected tunnels forms an optical closed-loop path. Further, at least one anode and one cathode are each mounted on the block and in communication with the gas. Each of the components, including the mirrors, anode, and cathode, must be sealed to the block to form a gas tight seal. The block is usually filled with a lasing gas such as a mixture of helium and neon. A sufficiently large electrical potential is applied between the anode and cathode to cause a discharge current therebetween which results in the production of a pair of counter-propagating laser beams within the block.

Associated with ring laser angular rate sensors is a source of error usually referred to as "lock-in." The source of error is thought to be predominantly caused by back scattering of light at each of the mirrors which form in part the optical closed-loop path which the counter-propagating laser beams traverse. As is well understood by those skilled in the art, there are two widely used techniques applied together to minimize the lock-in error. The first technique consists of dithering the block as taught in U.S. Pat. No. 3,373,650. Mechanically dithering the laser block reduces the source of error caused by lock-in to acceptable levels such that ring laser angular rate sensors have become commercially successful. The second technique consists of producing mirror assemblies structured so as to provide highly polished substrates having superior reflective coatings which achieve minimal laser beam scattering at the surfaces thereof. Development of the mirror assemblies over the years has made it possible for high performance ring laser angular rate sensors.

Prior art mirror assemblies comprise a block of material suitably polished for a mirror substrate. The mirror substrate usually is the same material as the laser block material so that they have matched thermal coefficients of expansion. Commonly, the mirror assembly further comprises alternating layers of a high dielectric material, for example, titanium dioxide ($TiO_2$) and a lower dielectric material, for example, silicon dioxide ($SiO_2$), deposited on the mirror substrate by a deposition process such as e-beam deposition or an ion-beam sputtering process, or any other appropriate process to achieve high grade mirrors.

The mirror assemblies of the prior art are usually fixed to the laser block by what is referred to as an optical contact. The optical contact technique requires that the block and the mirror substrate be highly polished so as to form an optical contact when the mirror substrate is pressed against the block. The joining of the laser block and the mirror block by optical contact is usually accomplished at room temperatures.

The mirror assemblies referred to above include a substrate in the form of a block of material having a reflective surface deposited thereon such as the titanium dioxide variety described above. Further, the mirror assemblies may include transducers for controlling optical path length, alignment, and the like. Mirror transducers may be like those shown in U.S. Pat. No. 3,581,227, issued to Podgorski, and assigned to the assignee of the present invention, U.S. Pat. No. 4,383,763, issued to Hutchings et al, U.S. Pat. No. 4,160,184, issued to Ljung, and UK patent application GB 2,104,283 in the name of Litton Systems, Inc. The just above-referred to patents being incorporated herein by reference.

Ring laser sensors of the kind referred to above further include a plurality of electrodes including anodes and cathodes of various constructions like that shown in U.S. Pat. No. 4,007,431, issued to Abbink et al and herein incorporated by reference.

These prior art ring laser angular rate sensors have been proven highly satisfactory in operation and are rapidly gaining wide-spread acceptance for certain applications. These prior art ring laser angular rate sensors, however, are costly to manufacture.

Ring laser angular rate sensors demand dimensionally stable material for many of the parts, and specifically the laser block and the mirror assemblies. This is so, since a closed-loop optical path has only so much leeway in position relative to the tunnels of the cavity and size of the mirrors. The ring laser assembly tolerances are far more critical than simple linear (single line tube) lasers. The mirror assemblies usually include a substrate of material which has thermal and mechanical characteristics substantially similar to those of the block. Commonly, the mirror substrate and the block are of the same material. This is so since the mirror substrate and the block would then have identical thermal coefficients of expansion. In order not to introduce another material type between the block and the mirror substrate, mirror substrates are commonly bonded to the block by what is referred to as an optical contact. That is, the mirror mounting surface of the mirror substrate and end surfaces of the laser block are highly polished to provide an optical contact. Since the block and the mirror substrates are commonly of a quartz-like material, polishing of such surfaces is time consuming and expensive.

Others have attempted to bond the mirror substrate to the laser block by other techniques including epoxy, indium seals, and other materials, but such materials, as indicated earlier, introduce other problems which can deleteriously affect the sensor performance and/or life. Particularly, nonuniformly applied bonding materials between the mirror substrate and laser block may lead to poor or non-existing ring laser alignment within the block. Further, the materials may introduce particulate matter which may react with the lasing gas. All of these problems may cause deleterious effects on laser life and/or performance. Although bonding of the electrodes to the laser block is not as big a concern, forming of a gas tight seal and matching of materials is still important. Indium seals have proven satisfactory as a technique of bonding the electodes to the laser block.

SUMMARY OF THE INVENTION

The object of this invention is the provision of a novel construction and method of assembly of a ring laser angular rate sensor which permits it to be inexpensively manufactured. Briefly, this invention contemplates the provision of a ring laser angular rate sensor constructed from a solid block with mirror assemblies joined to the block by a thermally formed and gas tight seal comprised of a thin film bonding agent.

This invention further contemplates the construction of a mirror assembly transducer by utilizing a thin film of glass between selected piece parts.

DETAILED DESCRIPTION OF THE INVENTION

Figure 1:
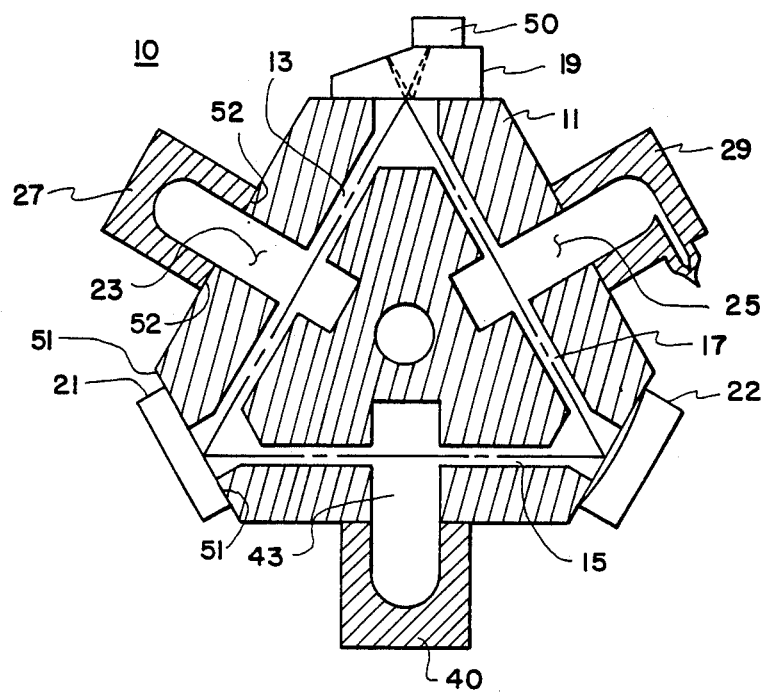
FIG. 1 is a planned view of a ring laser angular rate sensor constructed in accordance with the teaching of this invention.

Referring now to FIG. 1, there is disclosed a pictorial representation of a gas filled ring laser angular rate sensor 10 comprising a block 11 made of a quartz like material such as Cervit, Zerodur, or the like or glasses such as BK-7 (letter number combinations are Schott Optical Commercial Designations). A plurality of three interconnected tunnels 13, 15, and 17 are bored within block 11 at angles to each other to form a triangular-shaped cavity. Mirror assemblies 19, 21, and 22 are bonded to end surfaces of block 11 which form the intersection of each of the tunnels 13, 15, and 17, respectively, in a manner as will subsequently be described. Each mirror functions to reflect light from one tunnel into the next thereby forming a closed-loop optical path.

A pair of anodes 27 and 29 are bonded to end surfaces of laser block 11 and adapted to communicate with laser tunnels 13 and 17, respectively, through interconnecting cavities 23 and 25, respectively. A quantity of lasing gas for plasma is adapted to be contained within the tunnels 13, 15, and 17, and other tunnels in communication therewith. The gas may be inserted into the block cavities through one of the anode cavities used as a fill tube and one of the anodes which may also serve as a sealable port, e.g. anode 29.

A cathode 40 is bonded to an end surface of laser block 11 and in communication with the optical closed-loop cavity through interconnecting cavity 43. Cathode 40 is symmetrically located relative to anodes 27 and 29, and tunnels 13, 15, and 17. These symmetrical locations of the pair of anodes and cathode is intended to reduce gas flow effects which can adversely affect the performance of the rate sensor, as is well known.

In operation, with a sufficiently large potential applied between the cathode and the anodes, a first discharge current flows from cathode 40 out into tube 15 toward mirror 21 and through tube 13 to anode 27. A second discharge current flows through cathode 40 out into tube 15 toward mirror 22 and through tube 17 to anode 29. These two discharge currents are usually controlled in intensity. The discharge current's function is to ionize the lasing gas and thereby provide a pair of counter-propagating laser beams within the closed-loop optical cavity in a well known manner. It will be appreciated that ring laser angular rate sensors with a rectangular lasing path or other optical cavity configurations, including a cubic cavity, can be constructed in accordance with the teaching of this invention.

Each of the aforementioned mirrors perform functions in addition to redirecting the laser beams about the cavity. Mirror 19 may be constructed as to be partially transmissive for providing a readout beam signal to be directed toward a photosensitive means 50. Mirror 22 is preferably curved so as to aid in the alignment and focusing of the counter-propagating laser beams within the cavity. Lastly, mirror 21 may be in part a transducer for cavity path length control in a well known manner. A suitable readout device 50 is disclosed in U.S. Pat. No. 4,152,072, issued to Hutchings and is incorporated herein by reference thereto.

Figure 2:
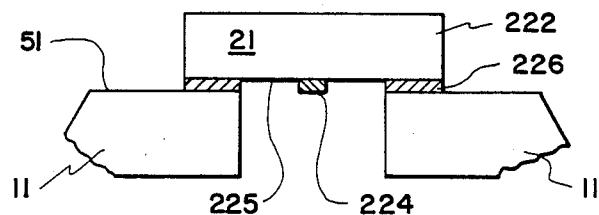
FIG. 2 is a planned view of the mirror block assembly in accordance with the invention.

The construction of the ring laser angular rate sensor described above and its performance are in accordance with the basic operating principles of prior art ring laser angular rate sensors. Referring now to FIG. 2, an important contributor to reducing the construction costs in accordance with the teaching of this invention is the use of a thermally formed film seal to join each of the mirror assemblies 19, 21, and 22 to laser block 11 which contains the interconnecting tunnels. Choice of a thermally formed film seal as the technique for bonding mirror assemblies to the laser block obviates the need for creating highly polished end surfaces on the block which are required by the optical contact technique for fixing the mirror assemblies to the block. Appropriately chosen thermally formed film seals provide Butt-Tensile strength in excess of that provided by the optical contact technique and avoids the thermal mismatch problems of prior art bonding techniques described earlier. In the preferred embodiment, the thermally formed film seal is comprised of a glass film vacuum sputtered on the surfaces. The film being so thin that thermal coefficient mismatch between the film and the bonded parts is negligible.

In the embodiment of the invention illustrated in FIGS. 1 and 2, the ring laser angular rate sensor block 11 is a solid block of dimensionally stable material to which the interconnecting tunnels are machined therethrough. FIG. 2 specifically illustrates the bonding of a mirror assembly 21 to laser block 11. Mirror assembly 21 is shown including substrate 222 formed from a dimensionally stable material, preferably the same material as the block. An optical coating 224 of alternating layers of zirconium dioxide and silicon dioxide is deposited on surface 225 of substrate 222 by the ion-beam deposition process. A suitable ion-beam process is that substantially shown and described in U.S. Pat. No. 4,142,958, entitled, "Methods for Fabricating Multi-Layer Optical Films" issued to Wei et al, and is hereby incorporated by reference.

The dimensionally stable material referred to above for laser block 11 and mirror substrate 222 may preferably be of the same material type, but it is not necessary they be the same within the scope of the present invention. Dimensionally stable materials are like those referred to above, namely quartz like material or glasses which are dimensionally stable in the presence of mechanical and thermal stresses. It is best, of course, that the materials be identical since it minimizes any mismatch of thermal coefficients.

In FIG. 2, an optical coating 224 is shown as only a spot having sufficient area to reflect impinging laser beams thereon. It is within the scope of the present invention that the entire surface 225 of substrate 222 may have the optical coating 224. Further, the optical coating 224 may still alternatively be a mirror chip on its own substrate bonded to substrate 222 in a suitable manner or in accordance with the teaching of the present invention.

In FIG. 2, mirror 21 is shown to be bonded to the end surface 51 of block 11 by a thin film of a thermally sealable bonding agent 226. In the preferred embodiment, the thin film bonding agent is comprised of a thin film of glass 226 first deposited on the mirror substrate 222 by vacuum-sputtered deposition. The glass or other bonding agent may also be deposited on the substrate 222 by other suitable processes in order to provide a very thin and uniform film of the thermally sealable bonding agent 226. In one method of deposition, a glass is selected as a target in a vacuum chamber and sputtered onto substrate 222 used as the workpiece. Examples of glasses which may be used are low thermal expansion glass such as Corning Glass No. 7594 which is a lead oxide glass, or No. 0211 which is a borosilicate glass, or the like. The thickness layer of the vacuum-sputtered glass could range from less than one micron thick to about 20 microns. The greater the thickness, the greater will be the tendency to have thermal mismatch effect which can cause short laser life. Therefore, the thickness of the film should be as little as needed to achieve the desired bonding strength.

In bonding substrate 222 to laser block 11, the substrate 222 is pressed against laser block end surface 51 in mated alignment. End surface 51 should be suitably polished to provide good mating ports, but much less than that required for optical contact. Block 11, glass film 226, and substrate 222 are heated together in a furnace to a temperature which causes the glass film to fuse the mirror substrate 222 and laser block 11 together. The temperature, of course, depends on the lower fusing temperature or softening-point of the glass selected. Successful results have been obtained at furnace temperatures in the range of 450° C. to 800° C.

Successful results have also been achieved with microwave melting of sputtered glass films containing lead oxide or other substances that couple well with microwaves. The advantage of microwave fusing of the sputtered glass film to achieve a bond between laser gyro components is that potentially temperature sensitive parts of the laser sensor block assembly such as mirror coatings, cathode coatings, evaporable getters, etc. can be kept cool by shielding them from the microwaves using microwave reflective barriers such as metal foils or using waveguides to concentrate the microwave energy at the sputtered glass film joints. Ordinary 600 watt household type microwave type ovens in which the parts to be fused were insulated with, for example, alumina wool insulation have been used to successfully achieve the desired bond within three minutes of oven operation.

Figure 3:
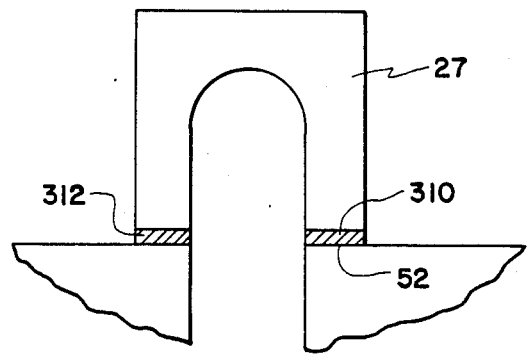
FIG. 3 is a planned view of bonding of an electrode to a laser block.

FIG. 3 illustrates the joining of anode 27 to end surface 52 of block 11. Anode 27 includes a mounting surface 310 having a glass film 312 deposited thereon in a manner as described above. It should be recognized by those skilled in the art that anode 27 and substrate 222 may be bonded to block 11 at the same time by placing the properly aligned parts together and heating them concurrently. This, of course, assumes that the anode or cathode materials have a sufficiently high melting point, for example, Invar.

It should be recognized by those skilled in the art that the novel construction technique as just described is applicable to all or any of anodes 27, 29, cathode 40, and mirror assemblies 19, 21 and 22.

Appropriate materials need to be chosen for the parts and assemblies which will have sufficiently high melting points. Further, the procedure or process of assembly may include glass materials of different melting points. Accordingly, the highest melting point glasses and parts would be assembled first, and lower melting point glasses and parts, would subsequently be assembled at lower temperatures.

Figure 4A:
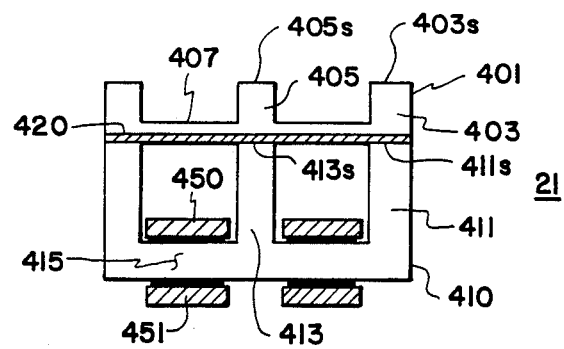
FIG. 4a–b is a planned view of a mirror transducer assembly in accordance with the present invention.
Figure 4B:
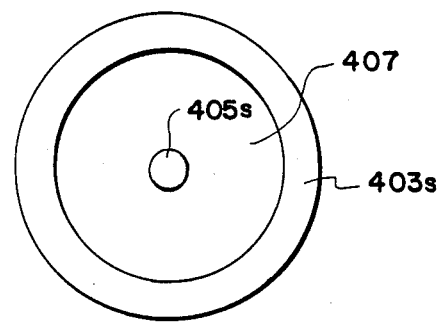

FIGS. 4a–b shows further details of mirror transducer assembly 21 within the scope of the present invention. A first substrate 401 of a dimensionally stable material includes a first outer wall member 403 surrounding a first central member 405. A membrane 407 interconnects the central member 405 to the outer wall member 403. As shown in FIG. 4a, the outer wall is a rim and the inner wall forms a central post. The structure as so far described resembles closely a transducer taught in U.S. Pat. No. 3,581,227 referred to above. It should be noted that central member 405 is shown extending away from member 407. Such extension is not necessary and that central member 405 may be part of membrane 407, and as such is intended to be within the scope of the present invention.

A second substrate 410 is shown including an outer wall member 411 in the form of a rim surrounding a central member 413 also forming a post. Like the first substrate, a membrane 415 interconnects central post 413 to outer rim 411. As illustrated in the drawings, surface 403s of outer wall member 403 and surface 405s of central member 405 are coplanar and surface 411s of outer wall 411 and surface 413s of central member 413 are also coplanar. Further, substrate 401 is shown to have a surface 420 in common with membrane 407 and members 405 and 403. It should be noted however that alternatively, the outer rim and central members may have surfaces extending beyond that of the membrane 407. As will be subsequently described, substrate 401 and substrate 410 will be bonded together such that movement of central member 413 can be coupled to movement of central member 405.

In order to complete the transducer, a pair of piezoelectric disks or wafers may be suitably bonded to both sides of the membrane 415 of substrate 410. Wafers 450 and 451 are shown to surround central member 415. Piezoelectric wafers 450 and 451 have electrodes (not shown) adapted for connection to an energy source. In operation, appropriately applied electrical energy to wafers 450 and 451 will cause one to expand and the other to contract, thereby causing movement of central member 413 to cause movement of central member 405 relative to outer rim surface 403s of substrate 403 in a well known manner.

It should be noted that FIG. 4 shows only one arrangement of piezoelectric wafers attached to a transducer substrate. Alternatively, one or more piezoelectric wafers may be attached to one side of membrane 415 in order to provide the intended function. It is within the scope of the present invention, that piezoelectric wafers may be bonded by the thin film glass structure and process as described herein. Further, the second substrate may be alternatively eliminated altogether as illustrated in FIG. 5 and will be explained in greater detail below.

As noted in FIG. 4, substrates 401 and 410 are bonded together by a thin film of glass being between outer wall surface 411s of substrate 410 and surface 420 of substrate 401, and the surface 413s of central member 413 of substrate 410 and surface 420 of substrate 401. The thin film of glass may be deposited on either surface 420 of substrate 401 and/or surfaces 411s and 413s before being pressed together and thermally sealed or fused together by applying or placing the two piece parts together and heating them in a furnace or other means such as microwave heating to an appropriate temperature.

Figure 5:
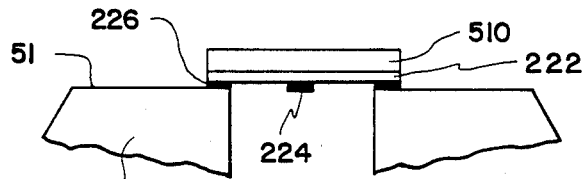
FIG. 5 is another arrangement of a mirror transducer assembly in accordance with the present invention.

FIG. 5 illustrates another transducer embodiment in which a piezoelectric devices 510 is suitably bonded to mirror substrate 222. The diagram of FIG. 5, except for the addition of piezoelectric wafer 510, has therein the components of FIG. 2 and so the same numeral designations are used in FIG. 5 as used in FIG. 2. Mirror coating 224 is preferably shown directly on substrate 222. The glass film is shown between the block 11 and substrate 222. This is so since the mirror coating would otherwise "float" and shift on molten glass when heated during assembly. Like FIG. 2, substrate 222 is bonded to laser block 11 in the manner described above. If substrate 222 is made very thin, the piezoelectric wafer may be sufficient to cause movement of mirror coating 224 in a direction perpendicular to the surface of the mirror coating. Although not shown, piezoelectric wafer 510 may be bonded by the sputtered thin film glass process as described herein. This, of course, depends on the PZT and the fusion temperature chosen since the PZT could de-polarize at high temperatures.

The sputtered-glass films of the present invention can be deposited on the mating piece parts, one or both, thin enough to avoid fracturing of the fused-glass seals. Coatings too thick could induce fracturing due to mismatch in the coefficient of expansion between the bonding glass film and the mating parts. Sputtered glass films have further advantages including that the coating obtained is identical to that of the glass target. The uniformity of sputtered glass films allows for great precision thus avoiding misalignment errors of mirror assemblies relative to a laser block. Lastly, sputtered glass films are dimensionally very stable.

Thin films of other thermally sealable bonding agents are within the scope of the present invention. If the films are thin enough, fracturing of the bond may be avoided.

Those skilled in the art will recognize that only preferred embodiments of the present invention have been disclosed herein and that the embodiments may be altered and modified without departing from the true spirit and scope of the invention as defined in the accompanying claims.

It should be recognized by those skilled in the art that all gas filled ring lasers are generally gas discharge devices, and that the mirror assemblies form end members for sealing the gas discharge device cavity. Further, the principals of the invention are applicable to any discharge device cavity configuration including a cavity for linear lasers in contrast to ring lasers.

The embodiments of the invention in which an exclusive property or right is claimed are defined as follows:

1. A transducer mirror assembly comprising:
    a first substrate of dimensionally stable material including a first outer wall member surrounding a first central member, and a first membrane interconnecting said first central member to said first outer wall member, said first outer wall member and said first central member having opposite planar first and second surfaces, said second surface of said first central member including a light reflecting means;
    a second substrate including a second outer wall member surrounding a second central member, and a second membrane interconnecting said second central member to said second outer wall member, said second outer wall member and said second central member having opposite planar first and second surfaces, said second central member being coupled to said first central member;
    a thin film glass layer, deposited by a selected thin film deposition process on portions of at least said first surface of a selected one of said first and second outer wall members, said thin film glass layer bonding together and in between said first surface of said first outer wall member and said first surface of said second outer wall member; and
    transduction means coupled to said second substrate for converting electrical energy into mechanical energy to alter the position of said first central member relative to said first outer wall member.

2. The transducer mirror assembly of claim 1 wherein said transduction means further comprises at least one piezoelectric wafer bonded to said second membrane and surrounding said second central member.

3. The transducer mirror assembly of claim 1 wherein said transduction means further comprises at least a second piezoelectric wafer bonded to said second membrane on an opposite said thereof as said first piezoelectric wafer and surrounding said second central member.

4. The transducer mirror assembly of claim 1 wherein the thickness of said thin film glass layer is less than 20 microns.

5. The transducer mirror assembly of claim 1 further comprising a thin film glass layer bonding together and in between said first surface of said first central member and said first surface of said second oentral member.

6. The transducer mirror assembly of claim 1 wherein said glass contains lead.

7. The transducer mirror assembly of claim 1 wherein said deposition process is vacuum sputtering.

* * * * *

UNITED STATES PATENT AND TRADEMARK OFFICE
CERTIFICATE OF CORRECTION

PATENT NO. : 4,865,436

DATED : September 12, 1989

INVENTOR(S) : Robert G. Ahonen, John Malenick and Hans P. Meyerhoff

It is certified that error appears in the above-identified patent and that said Letters Patent is hereby corrected as shown below:

Column 8, line 56, delete "oentral" and substitute with --central--.

Signed and Sealed this

Seventh Day of August, 1990

Attest:

HARRY F. MANBECK, JR.

Attesting Officer

Commissioner of Patents and Trademarks